United States Patent
Rafiee et al.

(10) Patent No.: US 10,628,211 B2
(45) Date of Patent: Apr. 21, 2020

(54) SYSTEMS AND METHODS FOR ASYNCHRONOUSLY CONSOLIDATING AND TRANSMITTING DATA

(71) Applicant: MASTERCARD INTERNATIONAL INCORPORATED, Purchase, NY (US)

(72) Inventors: Shawn Rafiee, Chesterfield, MO (US); Avijit Kanyal, St. Louis, MO (US); Richard Michael Navarro, St. Charles, MO (US)

(73) Assignee: Mastercard International Incorporated, Purchase, NY (US)

( * ) Notice: Subject to any disclaimer, the term of this patent is extended or adjusted under 35 U.S.C. 154(b) by 212 days.

(21) Appl. No.: 15/624,558

(22) Filed: Jun. 15, 2017

(65) Prior Publication Data

US 2018/0365049 A1 Dec. 20, 2018

(51) Int. Cl.
| | |
|---|---|
| G06Q 20/08 | (2012.01) |
| G06Q 20/02 | (2012.01) |
| G06F 9/46 | (2006.01) |
| G06Q 20/20 | (2012.01) |
| G06Q 20/40 | (2012.01) |

(52) U.S. Cl.
CPC .......... *G06F 9/466* (2013.01); *G06Q 20/027* (2013.01); *G06Q 20/08* (2013.01); *G06Q 20/204* (2013.01); *G06Q 20/401* (2013.01)

(58) Field of Classification Search
None
See application file for complete search history.

(56) References Cited

U.S. PATENT DOCUMENTS

| | | |
|---|---|---|
| 6,817,018 B1 | 11/2004 | Clarke et al. |
| 7,289,964 B1 | 10/2007 | Bowman Amuah |
| 7,707,177 B2 | 4/2010 | Bank et al. |
| 7,890,955 B2 | 2/2011 | Paramasivam et al. |

(Continued)

FOREIGN PATENT DOCUMENTS

WO 2001016704 A2 3/2001

OTHER PUBLICATIONS

PCT International Search Report and Written Opinion, Application No. PCT/US2018/031989, dated Aug. 8, 2018, 12 pps.

(Continued)

*Primary Examiner* — Edan Orgad
*Assistant Examiner* — Emmanuel K Maglo
(74) *Attorney, Agent, or Firm* — Armstrong Teasdale LLP

(57) ABSTRACT

A worker computing device for asynchronous data consolidation and transmission over a computer network is provided. The worker computing device includes a processor communicatively coupled to continuously receive a plurality of individual computer messages from a source and accumulate the plurality of individual computer messages within a queue until at least one threshold value is reached. The worker computing device is also configured to consolidate the plurality of individual computer messages accumulated within the queue into a single batched message when the at least one threshold value is reached. The worker computing device is further configured to compress and serialize each individual message within the single batched message, and send the single batched message over the computer network.

21 Claims, 9 Drawing Sheets

(56) References Cited

U.S. PATENT DOCUMENTS

| | | | |
|---|---|---|---|
| 8,341,134 B2 | 12/2012 | Bourbonnais et al. | |
| 9,607,621 B2 | 3/2017 | Karpey et al. | |
| 9,634,962 B2 | 4/2017 | Harran et al. | |
| 2007/0094336 A1 | 4/2007 | Pearson | |
| 2007/0234369 A1* | 10/2007 | Paramisivam | G06F 9/546 719/313 |
| 2007/0257103 A1* | 11/2007 | Fisher | G06Q 20/24 235/380 |
| 2009/0241118 A1 | 9/2009 | Lingamneni | |
| 2010/0125470 A1* | 5/2010 | Chisholm | G06Q 20/4016 705/35 |
| 2010/0301114 A1* | 12/2010 | Lo Faro | G06Q 20/357 235/380 |
| 2011/0167057 A1* | 7/2011 | Lamm | G06Q 10/10 707/722 |
| 2011/0251952 A1* | 10/2011 | Kelly | G06Q 20/14 705/40 |
| 2013/0339473 A1 | 12/2013 | McCaffrey et al. | |
| 2014/0229203 A1* | 8/2014 | Dean | G06F 19/328 705/4 |
| 2015/0227923 A1 | 8/2015 | Kutsch et al. | |
| 2015/0332331 A1* | 11/2015 | Sura | G06Q 30/0264 705/14.61 |
| 2016/0092552 A1* | 3/2016 | Morfonios | G06F 11/14 707/737 |
| 2016/0294782 A1 | 10/2016 | Hopkins et al. | |
| 2016/0294784 A1 | 10/2016 | Hopkins et al. | |
| 2017/0004020 A1* | 1/2017 | Chen | G06F 9/541 |
| 2018/0018599 A1* | 1/2018 | Jensen | G06Q 10/06 |

OTHER PUBLICATIONS

"MQSeries.net :: View topic—IS08583 protocol support with broker", Jun. 16, 2010, XP055495979, Retrieved from the Internet: URL:http://mqseriesnetphpBBviewtopicphpt=54024&postdays=0&postorder=asc&start=0&sid=5le6793b7c0c5754fb6fe8d93d5c5ell [retrieved on Jul. 30, 2018], 4 pps.

Peter Potkay et al: "MQSeries.net Forum Index > General IBM MQ Support > Batch size", Nov. 13, 2008, XP055495874, Retrieved from the Internet:URL:https://www-05.ibm.com/e-business/linkweb/publications/servlet/pbi.wss?CTY=US&FNC=SRX&PBL=SC34-6931-01 [retrieved on Jul. 27, 2018], 3 pps.

"Intercommunication", Sep. 14, 2014, XP055495884, Retrieved from the Internet: URL:ftp://public.dhe.ibm.com/software/integration/wmq/docs/V7.0/PDFs/MQ-V7.0.1.4.PDF.zip [retrieved on Jul. 27, 2018]. Parts 1, 2, and 3.

"FTP Listing of/software/integration/wmq/docs/V7.0/PDFs/at public.dhe.ibm.com", Sep. 17, 2014, pp. 1-1, XP055495898, Retrieved from the Internet: URL:ftp://public.dhe.ibm.com/software/integration/wmq/docs/V7.0/PDFs/ [retrieved on Jul. 27, 2018].

"MQ-V7.0.1.4. PDF.zip contents", Sep. 14, 2014, XP055495904, Retrieved from the Internet:URL:ftp://public.dhe.ibm.com/software/integration/wmq/docs/V7.0/PDFs/MQ-V7.0.1.4.PDF.zip, [retrieved on Jul. 27, 2018].

\* cited by examiner

SYSTEMS AND METHODS FOR ASYNCHRONOUSLY CONSOLIDATING AND TRANSMITTING DATA

BACKGROUND

The field of the present disclosure relates generally to networks and, more particularly, to systems and methods for asynchronously consolidating and transmitting multiple computer messages as single batched messages for improving the number of individual messages capable of being sent over a computer network.

Computer devices transmit messages back and forth over networks. For example, a remote computing device may send a computer message to a server device for processing. Part of that processing may require the server to send messages to a sub-processing device for further processing of data, and then return the messages with the sub-processed data. In some cases, these devices must perform these tasks within a predefined time or processing may be subject to cancelling. It is important to have sufficient bandwidth to process these computer messages.

For example, conventional payment processing systems process large volumes of payment transaction messages. During a typical payment transaction, a processing system receives an authorization request message from, for example, an acquirer device for processing. In some situations, the processing system is under a service level agreement (SLA) to provide a response to the authorization request message within a predefined period of time (SLA response time). If the processing system fails to respond to the authorization request message within the SLA response time, the transaction may automatically be denied. Such denied transactions are detrimental to the payment processor as well as the other parties to the transaction, such as the cardholder consumer, the merchant, and the acquirer.

During at least some payment transactions, consumers (e.g., cardholders) provide account data that may be used to authorize the consumer as an authorized user of the payment card. In some cases, the consumer may also provide other data (e.g., device data that may also be used in authorizing the transaction). The processing system may utilize a sub-processing system, such as a fraud detector system, to analyze the transaction data (e.g., comparing a sample biometric data from the transaction data to a reference biometric data of the authorized user stored in the system) included in the authorization request message. In these known systems, the sub-processing system transmits the authorization request message using one message per transaction. During normal operations, the sub-processing system may, for example, respond to an authorization request message within seconds. However, under certain circumstances, such as periods of large transaction volume, the sub-processing system may become constrained. For example, under larger volumes, the response time for authorization request messages may increase to 2× seconds. This increase in time caused by the sub-processing system may cause the overall transaction to violate an SLA, and thus cause the transactions to be denied.

BRIEF DESCRIPTION

In one aspect, a worker computing device for asynchronous data consolidation and transmission over a computer network is provided. The worker computing device includes a processor communicatively coupled to a memory and is configured to continuously receive a plurality of individual computer messages from a source, and accumulate the plurality of individual computer messages within a queue until at least one threshold value is reached. The worker computing device is also configured to consolidate the plurality of individual computer messages accumulated within the queue into a single batched message when the at least one threshold value is reached, to further serialize each individual message within the single batched message, and send the single batched message over the computer network.

In another aspect, a computer-implemented method for asynchronous data consolidation and transmission over a computer network is provided. The method is performed using a worker computing device that includes at least one processor in communication with at least one memory device. The method includes continuously receiving a plurality of individual computer messages from a source and accumulating the plurality of individual computer messages within a queue until at least one threshold value is reached. The method also includes consolidating the plurality of individual computer messages accumulated within the queue into a single batched message when the at least one threshold value is reached, further serializing, by the worker computing device, each individual message within the single batched message, and sending, by the worker computing device, the single batched message over the computer network.

In yet another aspect, a non-transitory computer readable medium that includes executable instructions for asynchronous data consolidation and transmission over a computer network is provided. When the computer executable instructions are executed by a worker computing device that includes at least one processor in communication with at least one memory device, the computer executable instructions cause the worker computing device to continuously receive a plurality of individual computer messages from a source and accumulate the plurality of individual computer messages within a queue until at least one threshold value is reached. The computer executable instructions also cause the worker computing device to consolidate the plurality of individual computer messages accumulated within the queue into a single batched message when the at least one threshold value is reached, to further serialize each individual message within the single batched message, and send the single batched message over the computer network.

BRIEF DESCRIPTION OF THE DRAWINGS

FIG. 1 is a schematic diagram illustrating an example multi-party payment platform system for asynchronously consolidating and transmitting multiple computer messages.

FIG. 2 is a simplified block diagram of an example processing system for asynchronously consolidating multiple computer messages.

FIG. 3 is an expanded block diagram of an example embodiment of a server architecture of a processing system including other computing devices in accordance with one embodiment of the present disclosure.

FIG. 4 illustrates an example configuration of a user system operated by a user, such as the cardholder shown in FIG. 1.

FIG. 5 illustrates an example configuration of a server system such as the server system shown in FIGS. 2 and 3.

FIG. 6 is an example payment transaction environment including a payment processing system in which processing steps of asynchronously consolidating and transmitting multiple computer messages are managed by a worker computing device.

FIG. 7 is an example method for asynchronously consolidating multiple computer messages in the payment transaction environment shown in FIG. 6.

FIG. 8 illustrates an example of asynchronous thread sequence used for implementing the method shown in FIG. 7.

FIG. 9 shows an example configuration of a database within a computing device, along with other related computing components, that may be used to consolidate multiple computer messages in one message and transmit the message to the sub-processing system shown in FIG. 6.

DETAILED DESCRIPTION

Figure 1:
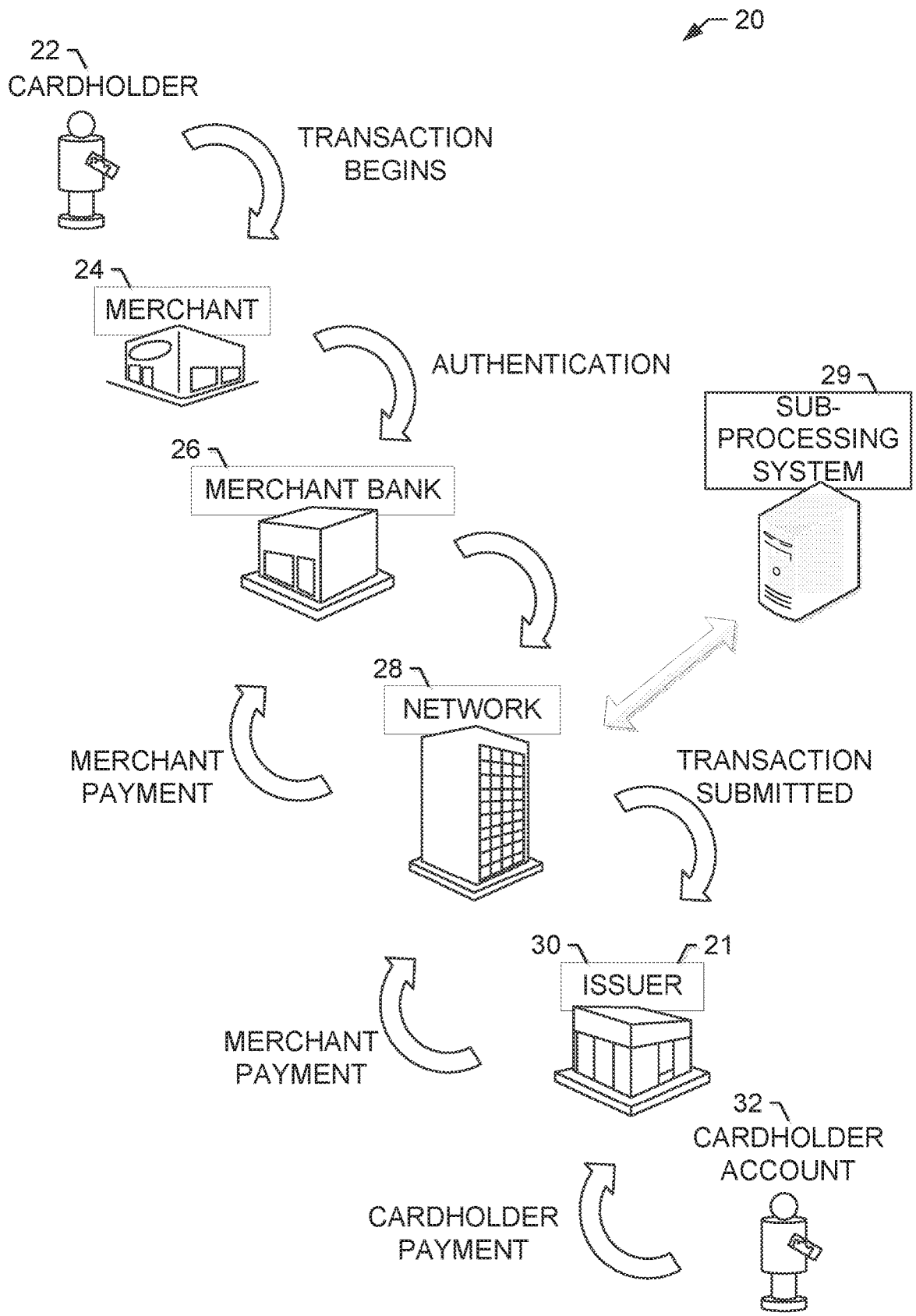
FIGS. 1-9 show example embodiments of the methods and systems described herein.

Systems and methods are described herein for asynchronous data consolidation and transmission over a computer network. In the example embodiment, a processing system utilizes a sub-processing system to analyze transaction data in an authorization request message, and more specifically, the sub-system analyzes cardholder account data, such as sample biometric data, collected from a cardholder during a payment transaction. The processing system transmits the authorization request message to the sub-processing system. The sub-processing system performs the necessary sub-processing steps to perform the authorization, and the sub-processing system transmits a response back to the processing system. The processing system may asynchronously consolidate and transmit the authorization request message to a message queue (MQ) using IBM® WebSphere MQ. (IBM is a registered trademark of International Business Machines Corporation located in Armonk, N.Y.). These messages are referred to hereinafter as MQ messages.

In the example embodiment, the processing system includes a worker computing device that consolidates multiple computer messages in one MQ message. In the example embodiment, the computer messages include authorization request messages for payment card payment transactions (e.g., ISO 8583 messages). The processing system may be under a service level agreement (SLA) that defines a maximum response time to process each authorization request message. The worker computing device consolidates multiple computer messages in one MQ message to meet the SLA response time for processing the authorization request messages (e.g., the amount of time elapsed between the time an authorization message is sent to the sub-processing system and the time a response is received from the sub-processing system), and asynchronously transmits the MQ message over a computer network.

During periods of large volume, the average response time(s) of the sub-processing system may climb. In some unrestrained situations, higher response times may cause the overall processing system to become noncompliant with the SLA, and thus cause some transactions to be denied. If the response times of the sub-processing system exceed the SLA response time requirement, most or all transactions may be denied due to the SLA timeout. The worker computing device utilizes a batch worker and a batch manager to consolidate multiple computer messages in one MQ message and schedule the time the MQ message has to be transmitted. The batch manager is configured to set a maximum number of individual computer messages per MQ message (e.g., batched message of multiple individual messages). The batch manager also creates a batch timer and schedules it to run based on a predefined time threshold. The batch timer is configured to compare the current time with the last time a computer message was added to the MQ message. The worker computing device also utilizes a controller worker, an output adaptor, and an input adaptor.

In other words, the worker computing device accumulates a plurality of individual computer messages (e.g., authorization or clearing messages) in a message queue. The worker computing device monitors the time that the messages are being accumulated and/or the number of messages being accumulated. There is a threshold value stored for either the time to accumulate or the number of messages that can be accumulated. Once a threshold level is satisfied, the queue is closed and the multiple messages are consolidated into a single batched message. By so doing, the number of messages capable of being processed through the system can be increased and the SLA can be better complied with.

In the example embodiment, a controller worker component is configured to manage the authorization and/or a clearing process. In alternative embodiments, the controller worker component is configured to manage any other transaction processes, such as an authentication and/or settlement process. The controller worker component may transmit computer messages to the output adaptor, may add data to the computer messages, and/or may filter the computer messages. In the example embodiment, the batch manager is configured to receive and accumulate computer messages. The batch worker is also configured to define the volume threshold, and also contains a batch timer which defines the time threshold. A batch worker component accepts accumulated computer messages from the batch manager once a time and/or volume threshold has been met and consolidates them. The batch worker component then sends the consolidated messages to an output adaptor configured to serialize and compress the consolidated computer messages in one MQ message, and asynchronously transmits the MQ message. In the example embodiment, the input adaptor is configured to receive MQ messages containing multiple computer messages, parse each computer message in each MQ message, and return each computer message one at a time to a data access object (DAO). Consolidating multiple computer messages in one MQ message helps improve the number of computer messages that can be successfully submitted and processed within the boundaries of the SLA, and based on the busyness of the sub-processing system.

In another embodiment, the worker computing device compares the number of computer messages in one MQ message to a predetermined number of computer messages set in the worker computing device. Once the number of computer messages in the MQ messages reaches the predetermined number of computer messages, the worker computing device transmits the MQ message to the MQ. For example, if the predetermined number of computer messages is fifty, the worker computing device compares the number of computer messages collected in the MQ message and if the number of transactions is equal to fifty, the worker computing device batches the computer messages and asynchronously transmits the MQ message to the MQ. However, if the number of computer messages is less than fifty, the worker computing device does not transmit the MQ message and continues collecting computer messages.

In another embodiment, the worker computing device compares the last time a computer message was added to a MQ message and a predefined time for transmitting a MQ message. In other words, the predefined time sets how often the worker computing device has to transmit a MQ message. For example, if the worker computing device is configured to transmit MQ messages either when the MQ message has fifty computer messages or when two seconds have elapsed since the worker computing device received the last computer message, the worker computing device will asynchronously transmit the MQ message after two seconds have elapsed even if the MQ message has less than 50 computer messages.

A technical effect of the systems and processes described herein include at least one of: (a) identifying, in the memory, a threshold value; (b) transmitting a plurality of computer messages to a sub-processing system; (c) consolidating, by the processor, the plurality of computer messages in a single MQ message; (d) batching, serializing, compressing, and asynchronously transmitting the MQ message to the MQ; (e) increasing the number of messages that can be sent through a computer network for increased bandwidth and increased processing; and (e) comparing the average response time and a service level agreement (SLA) time, wherein altering the threshold values is further based at least in part on the comparing.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account data, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment platform system 20 for processing payment transactions and, more specifically, for consolidating and transmitting multiple computer messages in accordance with this disclosure. Embodiments described herein may relate to a payment processing system, such as a credit card or debit card payment system using the Mastercard® interchange network. The Mastercard® interchange network is a set of proprietary communications standards promulgated by Mastercard International Incorporated® for the exchange of financial transaction data and the settlement of funds between financial institutions that are registered with Mastercard International Incorporated®. (Mastercard is a registered trademark of Mastercard International Incorporated located in Purchase, N.Y.).

In the payment processing system described herein, a financial institution called the "issuer" issues a transaction card, such as a credit card or a debit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone or on a website, but is oftentimes performed through the use of a point-of-sale (POS) terminal, which reads cardholder's 22 account data from a magnetic stripe, a chip, embossed characters, or the like, included on the transaction card and communicates electronically with the processing computers of merchant bank 26. In the context of transactions with online merchants, a cardholder 22 may provide cardholder account data, such as an account number, a card verification number, an expiration date, or the like, through a website. Alternatively, merchant bank 26 may authorize a third party to perform processing on its behalf. In this case, the POS terminal will be configured to communicate with the third party to perform transaction processing on its behalf. In this case, the POS terminal may be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

In the example embodiment, cardholder 22 provides cardholder account data, such as a biometric sample. During authorization, one or more parties to the transaction, such as interchange network 28, may communicate with a sub-processing system 29 that is configured to perform an authorization sub-process associated with the transaction. In the example embodiment, sub-processing system 29 performs authorization of transaction data (which includes account data) for payment transactions. Interchange network 28 includes a worker computing device which is capable of consolidating multiple individual computer messages into a single batched message for sending to sub-processor 29 for improved overall processing. During operation, interchange network 28 transmits transaction data to sub-processing system 29 using a MQ message as a part of the overall authorization process for payment transactions. In some situations, sub-processing system 29 may become constrained such that response times are delayed.

When a request for authorization (i.e., authorization request message) is accepted, the available credit line of cardholder's 22 account 32 is decreased. Normally, a charge for a payment transaction is not posted immediately to cardholder's 22 account 32 because bankcard associations, such as Mastercard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the POS terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the payment transaction information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account data, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
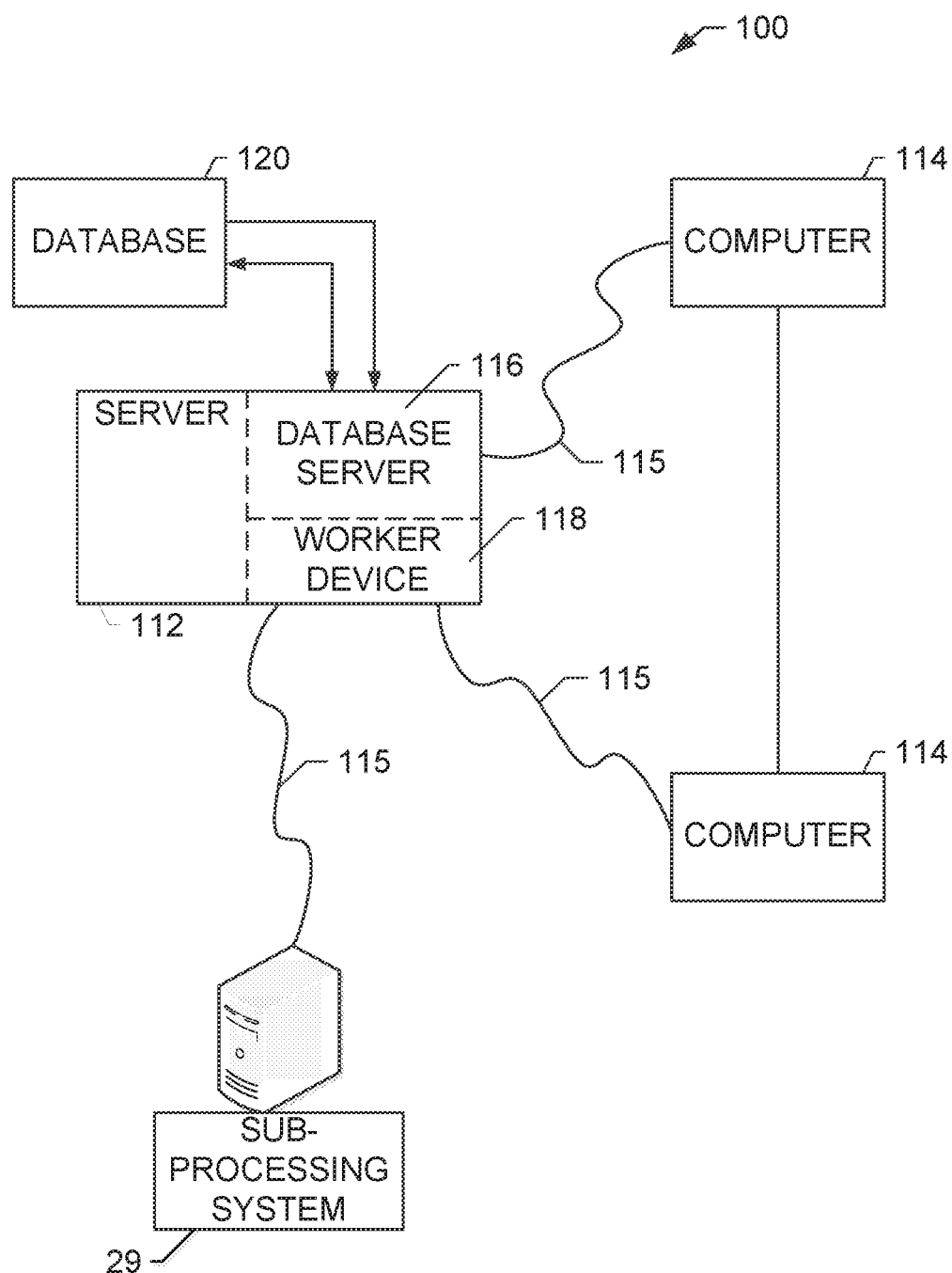

FIG. 2 is a simplified block diagram of an example processing system 100 for consolidating multiple computer messages in a single batched message. Processing system 100 includes a plurality of computing devices connected in communication in accordance with the present disclosure. In the example embodiment, processing system 100 may be used for processing payment transactions in the interchange environment shown in FIG. 1.

More specifically, in the example embodiment, processing system 100 includes a server system 112 in communication with a sub-processing system 29 (also shown in FIG. 1), and/or other client computer systems 114 associated with merchants, merchant banks, payment networks, and/or issuer banks. In the example embodiment, server system 112 includes at least database server 116 and worker computing device 118. In the example embodiment, at least one sub-processing system 29 receives, from server system 112, computer messages, such as authorization request messages of payment transactions, and provides responses to server system 112. In some embodiments, sub-processing system 29 is a third-party computing system. In other embodiments, sub-processing system 29 may be a component or module executed by server system 112. In still other embodiments, sub-processing system 29 may be associated with any of the parties to the transaction authorization process.

In the example embodiment, server system 112 is also in communication with a plurality of client sub-systems, also referred to as client computer systems 114. In one embodiment, client computer systems 114 are computers including a web browser, such that server system 112 is accessible to client computer systems 114 using the Internet. Client computer systems 114 and/or sub-processing system 29 are interconnected to the Internet through many interfaces including a network connection 115, such as a local area network (LAN) or a wide area network (WAN), dial-in-connections, cable modems, special high-speed Integrated Services Digital Network (ISDN) lines, and RDT networks. Client computer systems 114 could be any device capable of interconnecting to the Internet including a web-based phone, PDA, or other web-based connectable equipment.

Database server 116 is connected to database 120, which contains information on a variety of matters, as described below in greater detail. In one embodiment, database 120 is centralized and stored on server system 112 and can be accessed by potential users at one of client computer systems 114 by logging onto server system 112 through one of client computer systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, cardholders or customers, issuers, acquirers, savings amounts, savings account data, and/or purchases made. Database 120 may also store cardholder account data including at least one of a cardholder name, a cardholder address, an account number, an account identifier, and other cardholder account data. Database 120 may also store merchant data including a merchant identifier that identifies each merchant registered to use the network, and instructions for settling transactions including merchant bank account data. Database 120 may also store purchase data associated with items being purchased by a cardholder from a merchant, and authorization request data. Database 120 may also store liability acceptance information associated with parties to the transaction, such as merchants, merchant banks, payment networks, and/or issuer banks. Further, database 120 may also store rules for default liability and/or liability acceptance indicators for particular transactions.

In the example embodiment, one of client computer systems 114 may be associated with merchant bank 26 (shown in FIG. 1) while another one of client computer systems 114 may be associated with issuer bank 30 (shown in FIG. 1). Server system 112 may be associated with interchange network 28 or a payment processor. In the example embodiment, server system 112 is associated with a network interchange, such as interchange network 28 (shown in FIG. 1), and may be referred to as an interchange computer system or a payment processing computing device. Server system 112 may be used for processing transaction data. In addition, client computer systems 114 may include a computer system associated with at least one of an online bank, a bill payment outsourcer, a merchant bank, a merchant processor, an issuer bank associated with a transaction card, an issuer processor, a remote payment system, a token requestor, a token provider, and/or a biller.

In the example embodiment, worker computing device 118 is located within or in communication with server system 112 and may include a controller worker component, an output adaptor component, a batch worker component, a batch manager component, and a batch timer component (all described below). The worker computing device 118 is communicatively coupled to an input adaptor located in sub-processing system 29. Worker computing device 118 and input adaptor of sub-processing system 29 are interconnected via a network (e.g., the Internet) through many interfaces including a network connection 115, such as a local area network (LAN) or a wide area network (WAN), dial-in-connections, cable modems, special high-speed Integrated Services Digital Network (ISDN) lines, and RDT networks.

Figure 3:
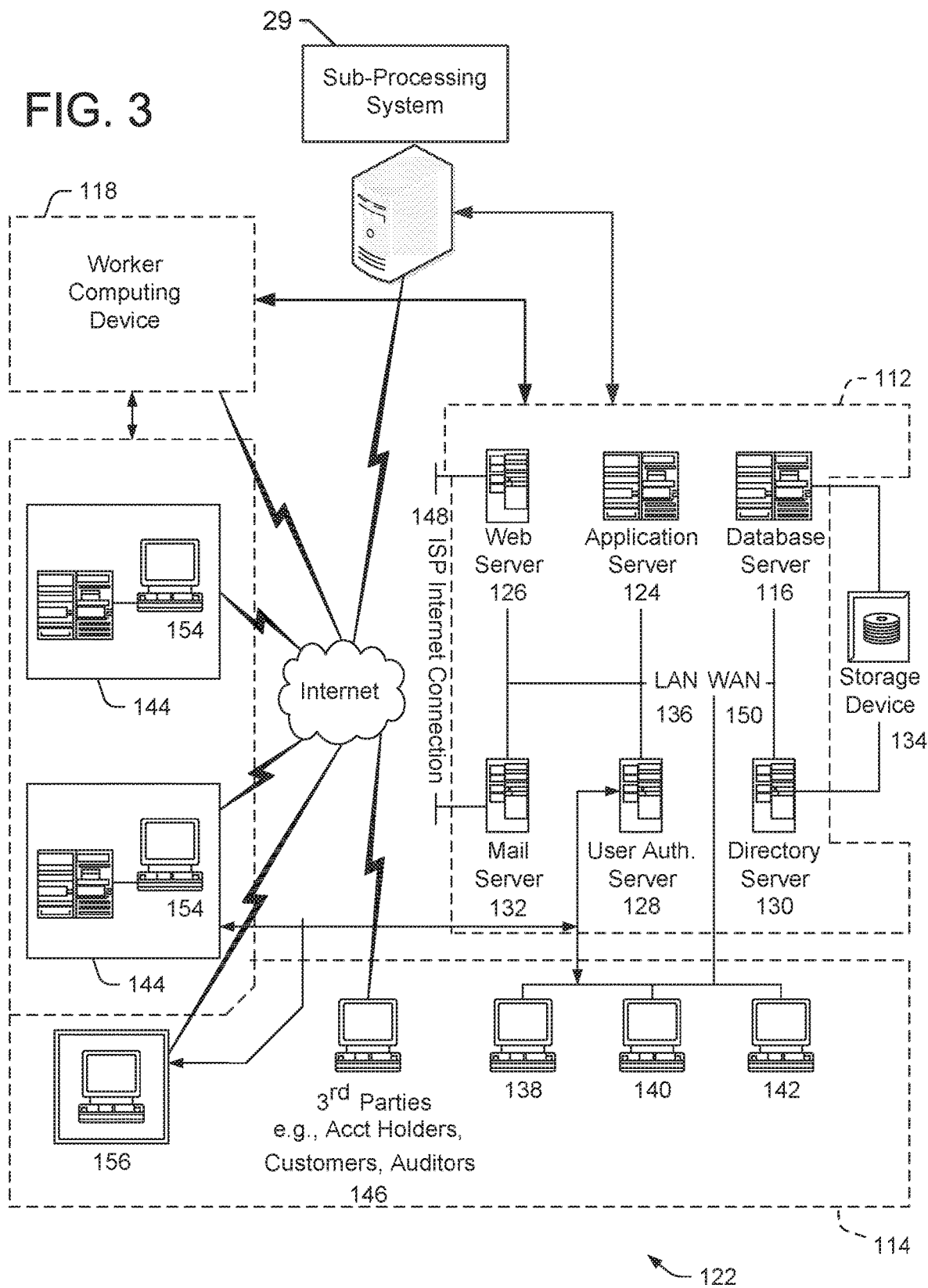

FIG. 3 is an expanded block diagram of an example embodiment of a server architecture of a processing system 122 including other computing devices in accordance with one embodiment of the present disclosure. In the example embodiment, processing system 122 is similar to processing system 100 (shown in FIG. 2). Components in processing system 122, identical to components of processing system 100, are identified in FIG. 3 using the same reference numerals as used in FIG. 2. Processing system 122 includes server system 112, client computer systems 114, worker computing device 118, and sub-processing system 29. Server system 112 further includes database server 116, an application server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In the example embodiment, client systems 114 include an issuer bank workstation 138, a merchant bank workstation 140, a third party processor workstation 142, third parties 146 (e.g., cardholders, customers, auditors, developers, cardholders (i.e., consumers), merchants, acquirers, issuers, etc.), and a manager workstation 156. In addition, issuer bank workstation 138, merchant bank workstation 140, and third party processor workstation 142 may be coupled to LAN 136 using network connection 115 (shown in FIG. 2). Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 (using a workstation 154) and to third parties 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, LAN 136 could be used in place of WAN 150.

In the example embodiment, any authorized individual having a workstation 154 can access processing system 122. In some embodiments, manager workstation 156 is located at a remote location. Workstations 154 and 156 are personal computers having a web browser. Also, workstations 154 and 156 are configured to communicate with server system 112. Furthermore, user authentication server 128 communicates with remotely located client systems, including manager workstation 156 using a telephone link. User authentication server 128 is configured to communicate with workstations 138, 140, and 142 as well.

Figure 4:
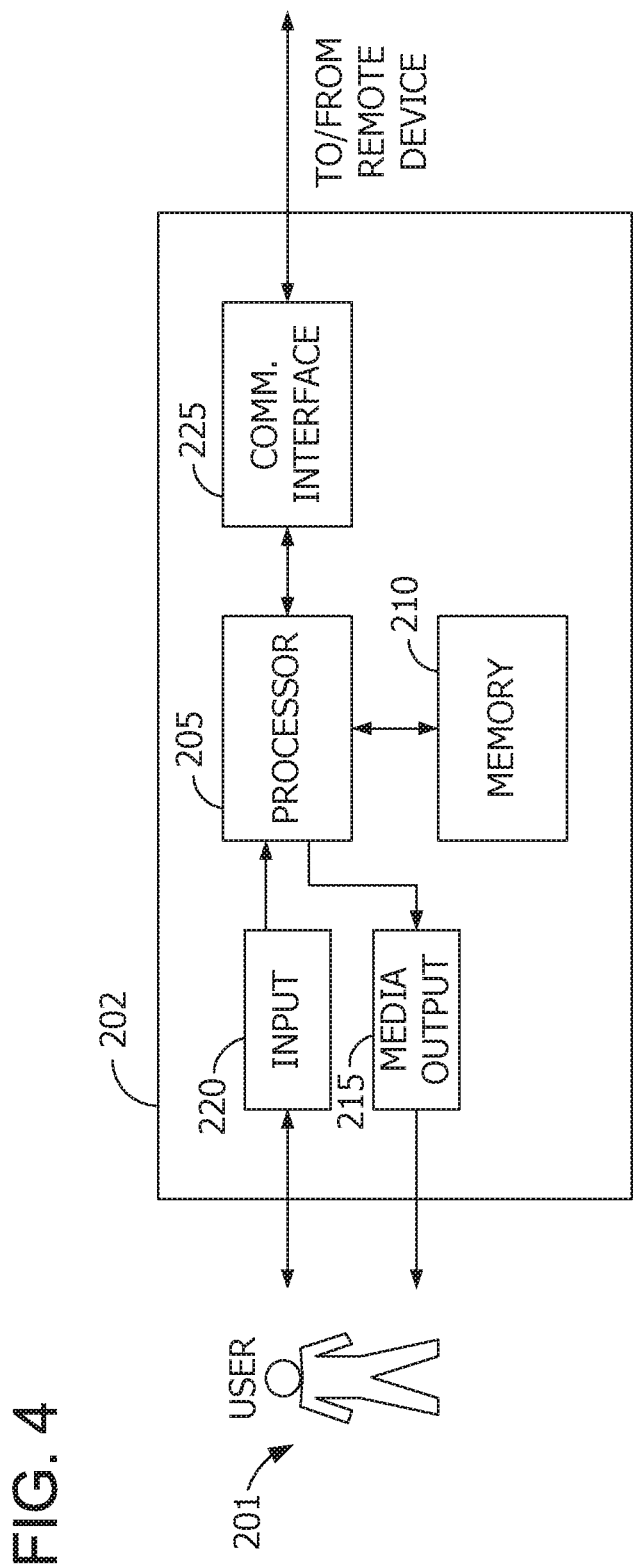

FIG. 4 illustrates an example configuration of a user system 202 operated by a user 201, such as cardholder 22, merchant 24 or other user (shown in FIG. 1). User system 202 may include, but is not limited to, client computer systems 114, 138, 140, and 142, worker computing device 118, sub-processing system 29, workstations 154, and manager workstation 156, as illustrated in FIG. 3. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output, such as a video adapter and/or an audio adapter. An output adapter is operatively coupled to processor 205 and may also be operatively coupled to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which may be communicatively coupled to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser, and client application. Web browsers enable users, such as user 201, to display and interact with media and other information typically embedded on a web page or a website from server system 112. A client application allows user 201 to interact with a server application from server system 112.

Figure 5:
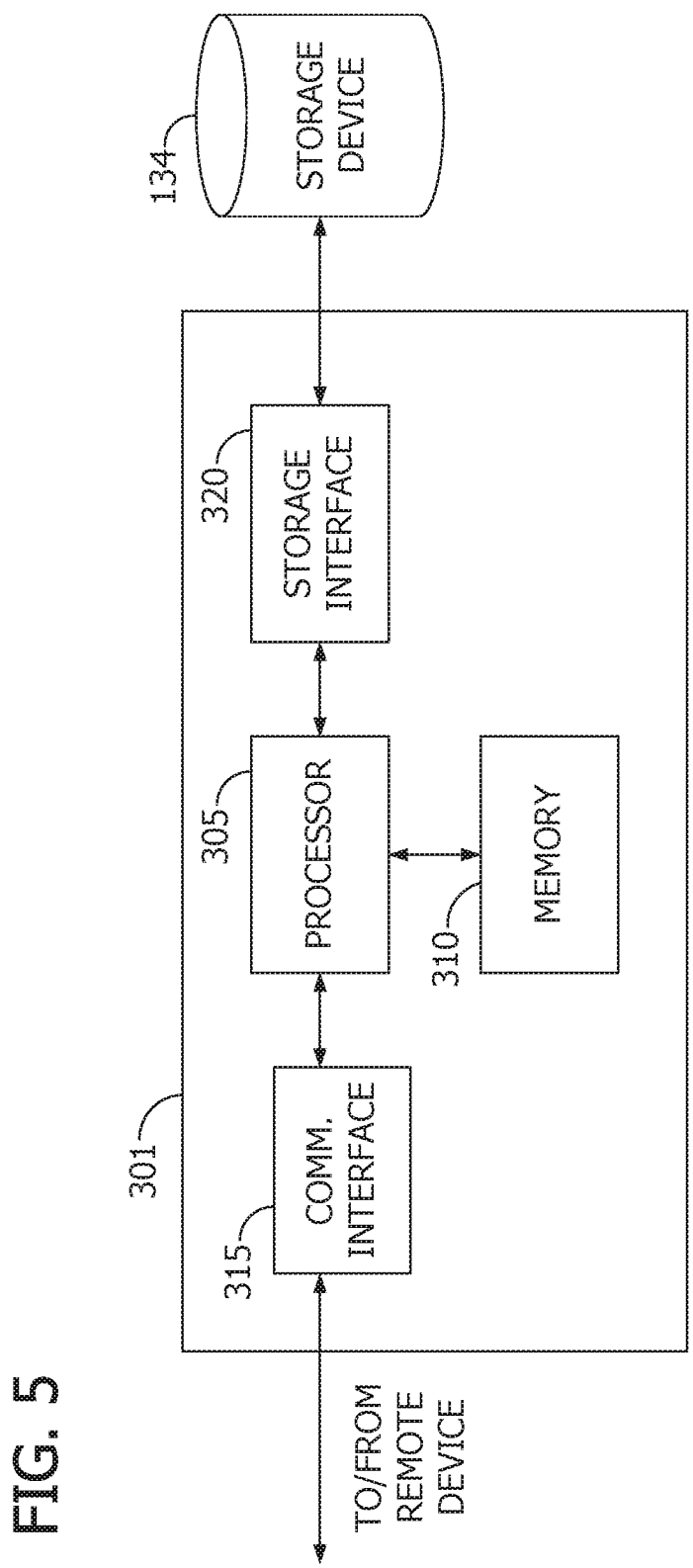

FIG. 5 illustrates an example configuration of a server system 301 such as server system 112 (shown in FIGS. 2 and 3). In some embodiments, server system 301 may be similar to sub-processing system 29 (shown in FIGS. 1-3). Server system 301 may include, but is not limited to, database server 116, application server 124, web server 126, user authentication server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from client computer system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
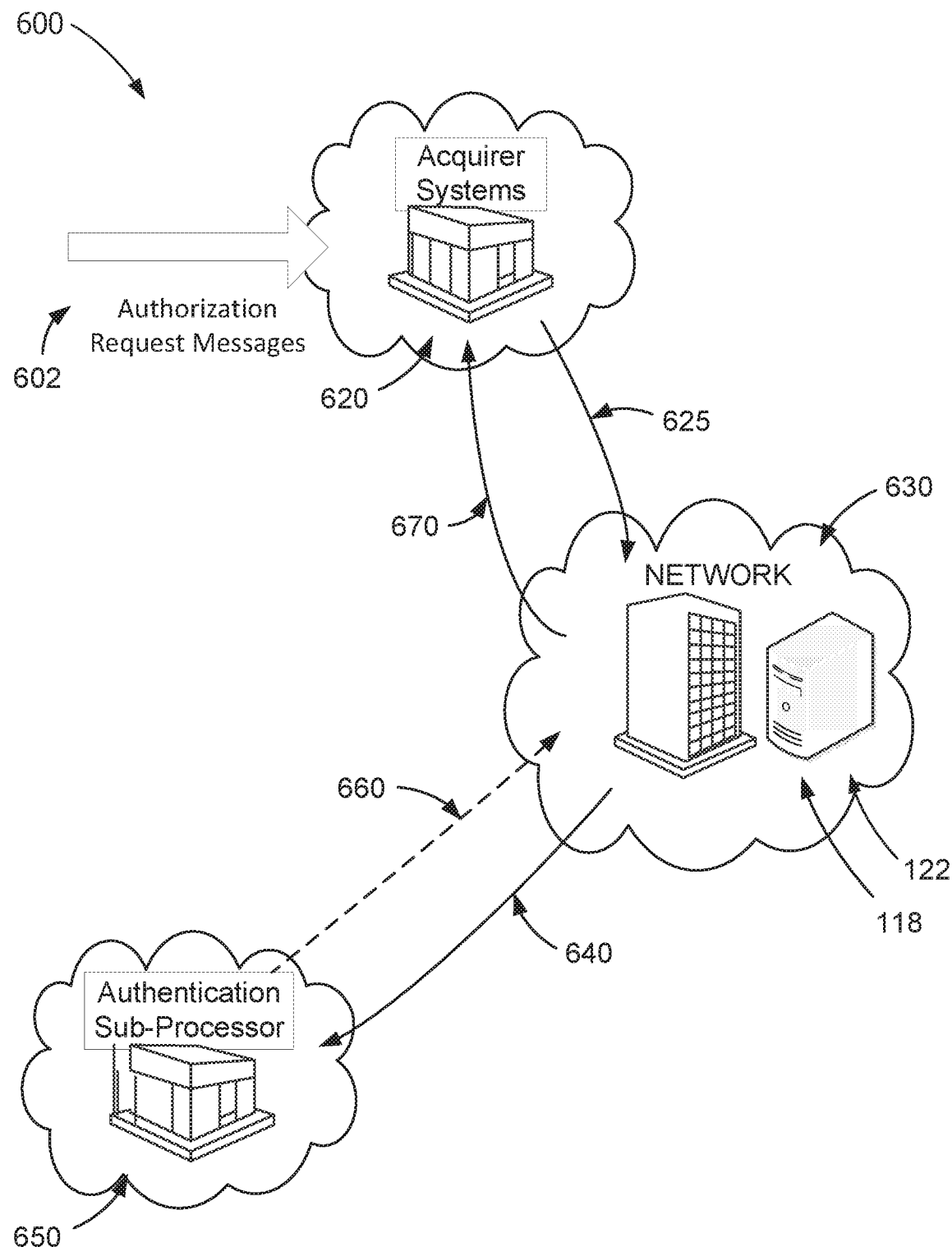

FIG. 6 is an example payment transaction environment 600 including processing system 122 in which processing steps are managed by worker computing device 118. In the example embodiment, computer messages are authorization request messages 602 which are transmitted from merchant banks 26 and/or acquirer systems 620. Acquirer systems 620 are in communication with an interchange network 630 (e.g., a payment processor, such as interchange network 28 (shown in FIG. 1)) and, more specifically, with processing system 122. Acquirer systems 620 interact with network 630 during authorization of payment transactions.

In the example embodiment, acquirer systems 620 transmit authorization request messages 602 to network 630 for authorization processing. Further, network 630 is under a service level agreement (SLA) to respond to some authorization request messages 602 within a predefined number of milliseconds. If network 630 does not respond within an SLA time limit, the authorization request message 602 may fail. In other words, if network 630 does not provide a quick enough response, the failed authorization request message 602 will cause the transaction to be automatically denied. As such, the timeliness of authorization request message processing by network 630 impacts the amount of failed authorization request messages and denied transactions, which negatively affects the parties involved in the transaction, such as the cardholder consumer, the merchant, the acquirer, the issuer, and the processing network. As used herein, the phrase service level agreement (SLA) time may be used to refer to a contractually agreed-upon response time cap, or it may be used more generally to refer to a maximum processing time that a processing system is given to respond to a request, regardless of how the SLA time is set.

Authorization request messages 602, in the example embodiment, include cardholder account data, such as a biometric sample, associated with the payment transaction initiated by the consumer. More specifically, during the initiation of a payment transaction, the consumer may provide a biometric sample such as, for example, a fingerprint, an iris scan, eye movement, voice sample, or a facial scan. The biometric sample is used during the authorization of the consumer (e.g., used to determine whether or not the consumer is the legitimate cardholder).

As is known in the art, biometric samples may be used to authorize individuals. One known, broad method of biometrics (e.g., biometric authorization) involves collecting a biometric sample (e.g., biometric identifiers) of a suspect (e.g., the person under examination) and comparing that sample to an authentic, pre-collected "target sample" or "reference sample" of a target individual (e.g., the person privileged for authorization). Known biometric identifiers include physiological characteristics, such as, for example, fingerprint, face recognition, palm print, hand geometry, iris recognition, retina and odor/scent, and may also include behavioral characteristics, such as, for example, typing rhythm, gait, and voice. Comparison algorithms are often specific to the particular type of biometric data at issue. Some biometric comparisons are known to be computationally intensive. In addition, target sample data may be considered sensitive, and may require careful data protection procedures, which may lead to a more scrutinize process that may require more time than any other process during the transaction process.

In the example embodiment, network 630 is in communication with an authentication sub-processor 650. In some embodiments, authentication sub-processor 650 is a third-party entity that provides authentication and/or authorization services and support processing related to biometric samples of cardholder 22 (shown in FIG. 1). For example, authentication sub-processor 650 may be a governmental entity or another entity, such as an issuing bank, that matches transaction data with target samples from a repository of transaction target samples that may be used to authorize payment transactions (e.g., establishing biometric identity). In other embodiments, authentication sub-processor 650 is a server or application component within network 630. In still other embodiments, authentication sub-processor 650 supports additional tasks associated with payment card authorization request messages.

In the example payment transaction environment 600, a "suspect" consumer provides a biometric sample as a part of an authorization request message 602. Network 630 receives the biometric sample along with the authorization request message 602 and performs transmission 640 of the biometric sample and other associated authorization data to authentication sub-processor 650. Authentication sub-processor 650 identifies a target sample from the other associated authorization data, compares the biometric sample to the target sample, and transmits an authorization response 660 to network 630 with biometric authorization data, such as affirming or denying the authorization. After receipt of authorization response 660, and after performing any other authorization processing, network 630 transmits a response 670, in response to authorization request message 602, including authorization response 660 indicating the network's 630 disposition on authorization. Network 630 may transmit response 670 to a requestor, such as acquirer system 620.

In the example embodiment, network 630 monitors response times associated with the processing of authorization request messages 602. The time that elapses between receipt 625 of an authorization request message 602 and the response 670 by network 630 to the authorization request message 602 is a "response time" for that particular request in the example embodiment (e.g., complete processing request time). In other embodiments, network 630 monitors a response time as the time that elapses between transmission 640 of the authorization request message to authentication sub-processor 650 and authorization response 660 back from the request (e.g., sub-processing request time).

In the example embodiment, a worker computing device 118 asynchronously consolidates multiple authorization request messages 602 in one MQ message (including biometric data) and is sent as transmission 640. In some embodiments, a worker computing device 118 batches individual computer messages (e.g., authorization messages) in one MQ message and transmits the MQ message as transmission 640 when the number of individual computer messages in the MQ message reaches a predetermined number. In other embodiments, worker computing device 118 batches individual computer messages (e.g., authorization messages) in one MQ message and transmits the MQ message when a predefined time has elapsed after the last authorization request message was batched in the MQ message. By batching multiple authorization messages within a single MQ message, server system 112 is able to process more transactions within the SLA time limit. Thus fewer transactions will be denied for failing to comply with the SLA.

Figure 7:
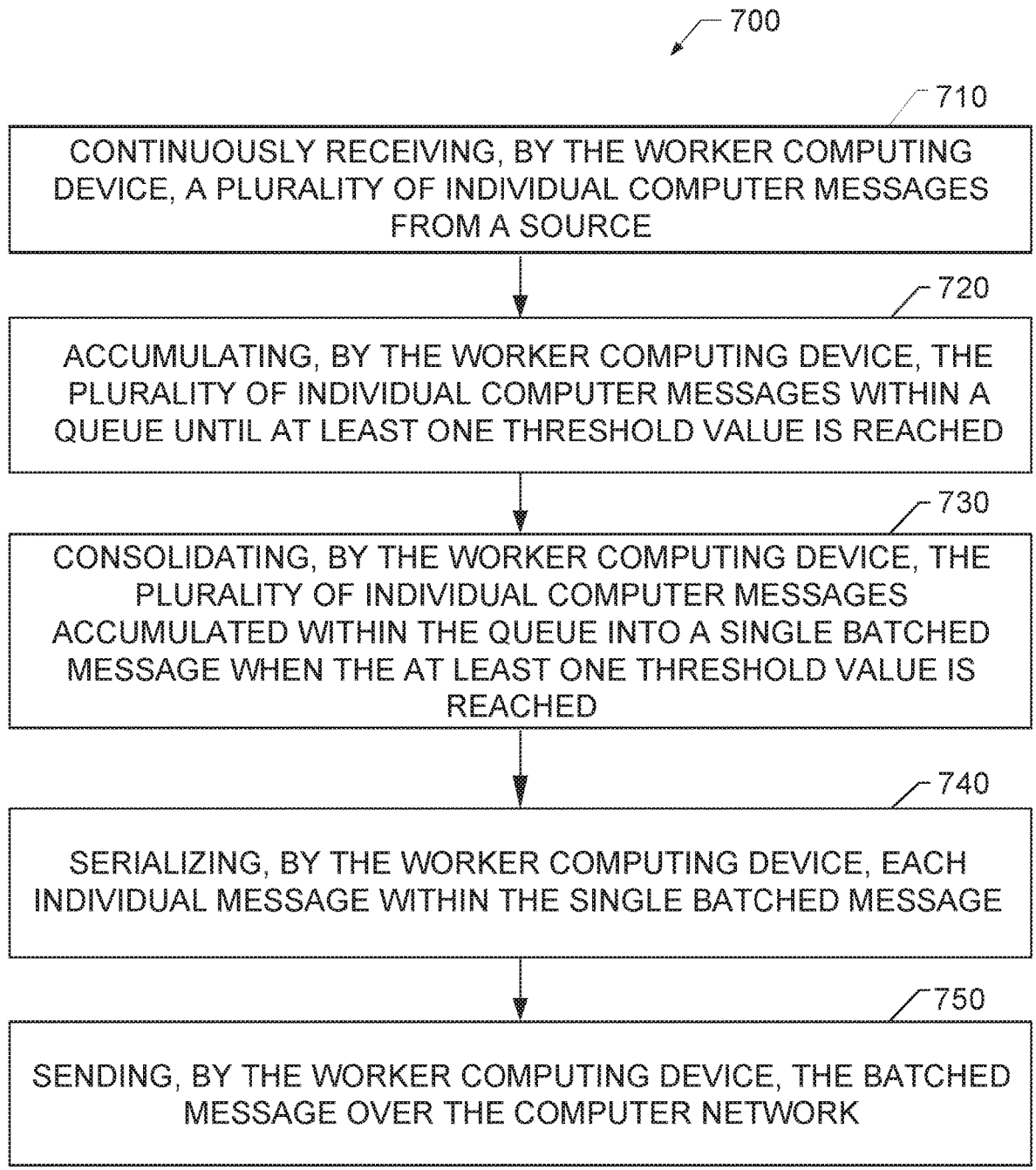

FIG. 7 is an example method 700 of consolidating multiple computer messages in a payment transaction environment 600 such as shown in FIG. 6. In the example embodiment, method 700 is performed by a worker computing device such as worker computing device 118 (shown in FIGS. 2 and 6) in conjunction with a computing system such as server system 112 (shown in FIG. 2), processing system 122 (shown in FIGS. 3 and 6), or computing device 910 (shown in FIG. 9).

In the example embodiment, method 700 includes continuously receiving 710 a plurality of individual computer messages from a source, and accumulating 720 the plurality of individual computer messages within a queue until at least one threshold value is reached. Method 700 also includes consolidating 730 the plurality of individual computer messages accumulated within the queue into a single batched message, such as a MQ message. Method 700 further includes identifying, in the memory, a threshold level and/or threshold value. In some embodiments, the threshold value is based at least in part on one or more of a demand for processing and a predefined level set by the worker computing device. In other embodiments, the threshold value is based at least in part on one or more of the average response time and a service level agreement (SLA) time. Method 700 may also include comparing at least one of time and volume to the predetermined threshold value, and batching the plurality of computer messages into the single batched message. Method 700 further includes serializing 740 each computer message of within the single batched message, compressing each individual computer message of the plurality of computer messages, and sending 750 the single batched message over the computer network. In some embodiments, comparing at least one of time and volume to a predefined threshold value includes comparing the time that elapsed since the last computer message was consolidated prior to comparing the volume of the single message to the predefined threshold value. Method 700 may also include comparing the average response time and a service level agreement (SLA) time, where altering the threshold value is further based at least in part on the comparing.

In some embodiments, method 700 includes asynchronously transmitting the MQ message to a database, an API call, or any other destination where the data of the multiple computer messages consolidated in the MQ message may be needed. In some embodiments, method 700 may include altering the threshold value based at least in part on the average response time. Further, in the example embodiment, method 700 is performed asynchronously to the clearing process or other transaction process that may perform during a payment transaction. As such, method 700 is independent from other processes occurring during the payment transaction. Thus, method 700 is able to process data without holds and/or interruptions from other processes, which decreases the data processing required by method 700.

Figure 8:
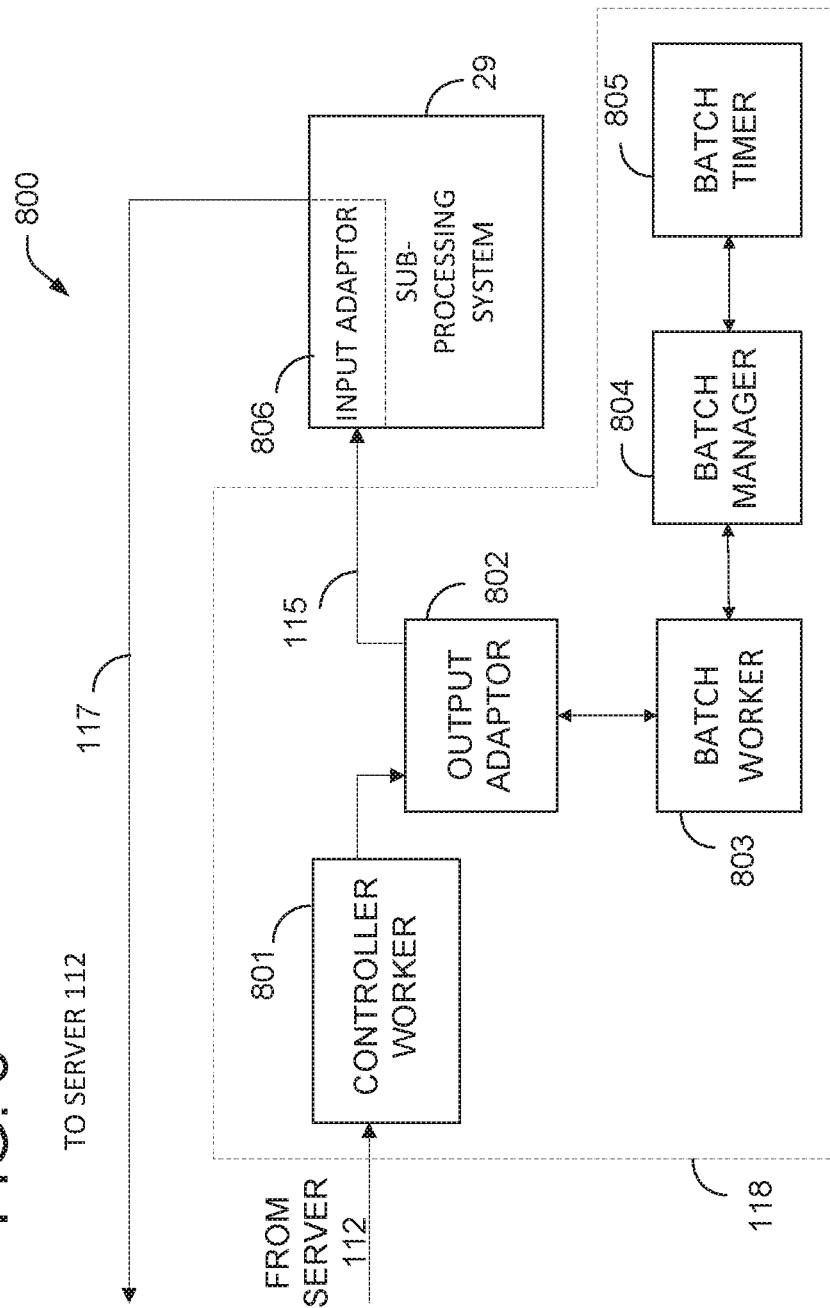

FIG. 8 illustrates an example asynchronous thread sequence 800 used for implementing the method shown in FIG. 7. Asynchronous thread sequence 800 runs asynchronously from the main transaction process sequence in order to decrease processing time of some specific transaction processes, such as authorization request message processes. In the example embodiment, asynchronous thread sequence 800 is performed by worker computing device 118 that receives individual computer messages from server system 112. Asynchronous thread sequence 800 includes a controller worker 801, output adaptor 802, batch worker 803, batch manager 804, and batch timer 805 for consolidating multiple computer messages in one MQ message, and scheduling the time the MQ message is transmitted. Controller worker 801 sends individual computer messages to output adaptor 802. Output adaptor 802 then instantiates batch worker 803 and sends batch worker 803 individual computer messages that require sub-processing. Batch worker 803 sends individual computer messages to batch manager 804, which creates a static list of messages. Batch manager 804 is configured to set a predetermined number of individual computer messages per each MQ message.

Batch manager 804 also creates batch timer 805 and schedules it to run based on a predefined time threshold. Batch timer 805 is configured to compare the current time with the last time a computer message was added to the MQ message. When either the number value established by batch manager 804 or the time value established by batch timer 805 is satisfied, the individual computer messages in batch manager 804's static list is returned to batch worker 803. Batch worker 803 further consolidates the individual messages and sends them to output adaptor 802. Output adaptor 802 then serializes the individual messages and sends them as a single MQ message across network connection 115 to an input adaptor 806 of sub-processing system 29. Input adaptor 806 is configured to de-serialize the individual messages and provide them one at a time to sub-processor 29 for sub-processing. Response messages are sent from sub-processing system 29 to server system 112 individually and asynchronously over a connection 117. Network connections 115 and 117 may be the same connection.

Figure 9:
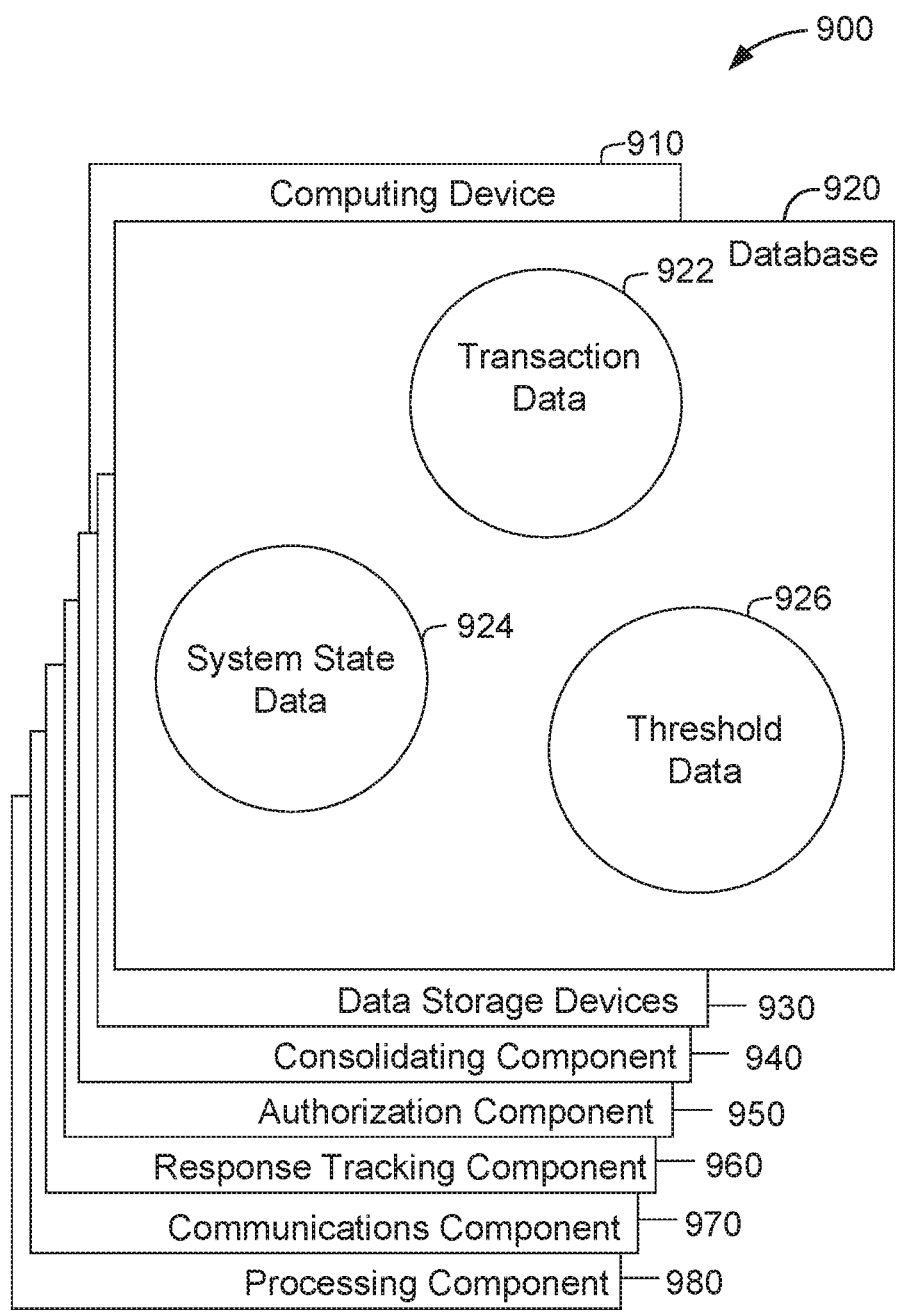

FIG. 9 shows an example configuration 900 of a database 920 within a computing device 910, along with other related computing components, that may be used to process payment transactions and, more specifically, consolidate multiple computer messages in one MQ message. In some embodiments, computing device 910 is similar to server system 112 (shown in FIG. 2), processing system 122 (shown in FIGS. 3 and 6), and/or server system 301 (shown in FIG. 5). Database 920 is coupled to several separate components within computing device 910, which perform specific tasks.

In the example embodiment, database 920 includes transaction data 922, system state data 924, and threshold data 926. In some embodiments, database 920 is similar to database 120 (shown in FIG. 2). Transaction data 922 includes information associated with payment transaction data, such as authorization request messages 602 (shown in FIG. 6). System state data 924 includes information associated with response times and average response times, current and historical data such as processing rates, such as described in reference to FIG. 6. Threshold data 926 includes data associated with worker computing device and predefined threshold values, such as described in method 700.

Computing device 910 includes the database 920, as well as data storage devices 930. Computing device 910 also includes a consolidating component 940, which may be similar to worker computing device 118 (shown in FIGS. 2 and 6), for consolidating multiple computer messages in one MQ message and transmitting the MQ message across a MQ. Computing device 910 also includes an authorization component 950 for processing transaction data. A response tracking component 960 is also included for tracking and managing transaction data during their pendency at network 630 (shown in FIG. 6). A communications component 970 is also included for receiving transaction data and transmitting MQ messages across the MQ. A processing component 980 assists with execution of computer-executable instructions associated with the system.

As will be appreciated based on the foregoing specification, the above-described embodiments of the disclosure may be implemented using computer programming or engineering techniques including computer software, firmware, hardware or any combination or subset thereof, wherein the technical effect is a flexible system for processing transactions across a MQ. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language.

As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

What is claimed is:

1. A worker computing device for asynchronous data consolidation and transmission over a computer network, the worker computing device comprising at least one processor and a memory, the worker computing device configured to:
   continuously receive a plurality of individual computer messages from a source;
   monitor a response time associated with each of the plurality of computer messages;
   compare the monitored response time of each message to a service level agreement (SLA) time threshold value;
   accumulate the plurality of individual computer messages within a queue until one of i) the response time associated with one of the plurality of computer messages reaches the SLA time threshold value and ii) at least one other threshold value is reached;
   consolidate the plurality of individual computer messages accumulated within the queue into a single batched message in response to one of the threshold values being reached;
   serialize each individual message within the single batched message;
   send the single batched message over the computer network to a sub-processing system; and
   in response to sending the single batched message, receive a plurality of response messages, each response message being associated with a respective serialized individual message.

2. The worker computing device of claim 1 wherein the at least one other threshold value comprises at least one of i) a time value for accumulating the plurality of individual computer messages within the queue, and ii) a number value of individual messages accumulated in the queue, wherein when at least one of the time value and the number value is satisfied, the queue is closed and the accumulated messages are consolidated.

3. The worker computing device of claim 1 wherein the plurality of individual computer messages includes authorization request messages for payment transactions initiated by a cardholder, the authorization request messages including biometric data for authenticating the cardholder as a legitimate cardholder, and wherein the batch message is transmitted to a biometric sub-processing system.

4. The worker computing device of claim 1 wherein the single batched message is transmitted to an input adaptor, the input adaptor configured to parse the single batched message into multiple individual computer messages for processing.

5. The worker computing device of claim 1 wherein the worker computing device comprises a batch manager component and an output adaptor component, the batch manager component configured to consolidate the plurality of individual computer messages into the single batched message and transmit the single batched message to the output adaptor.

6. The worker computing device of claim 5 wherein the output adaptor component is configured to accept the consolidated message, serialize each individual message within the consolidated message received from the batch manager component, and send the serialized message over the computer network.

7. The worker computing device of claim 3 wherein the individual computer messages include authorization request messages for payment transactions initiated by a cardholder with a merchant using a payment card, wherein the authorization request messages include candidate biometric data, and wherein the worker computing device is configured to send the single batched message to a sub-processing system for comparing the candidate biometric data to stored biometric data, and verify the cardholder as the legitimate cardholder.

8. A computer-implemented method for asynchronous data consolidation and transmission over a computer network, said method performed using a worker computing device comprising at least one processor in communication with at least one memory device, said method comprising:
   continuously receiving, by the worker computing device, a plurality of individual computer messages from a source;
   monitoring, by the worker computing device, a response time associated with each of the plurality of computer messages;
   comparing, by the worker computing device, the measured response time of each message to a service level agreement (SLA) time threshold value;
   accumulating, by the worker computing device, the plurality of individual computer messages within a queue until one of i) the response time associated with one of the plurality of computer messages reaches the SLA time threshold value and ii) at least one other threshold value is reached;
   consolidating, by the worker computing device, the plurality of individual computer messages accumulated within the queue into a single batched message in response to one of the threshold values being reached;
   serializing, by the worker computing device, each individual message within the single batched message;
   sending, by the worker computing device, the single batched message over the computer network to a sub-processing system; and
   in response to sending the single batched message, receive a plurality of response messages, each response message being associated with a respective serialized individual message.

9. The method of claim 8 wherein accumulating the plurality of individual computer messages within the queue further comprises accumulating the plurality of individual computer messages within the queue until at least one other threshold value is reached, wherein the at least one other threshold values includes i) a time value for accumulating the plurality of individual computer messages within the queue, and ii) a number value of individual messages accumulated in the queue, and wherein when at least one of the time value and the number value is satisfied, the queue is closed and the accumulated messages are consolidated.

10. The method of claim 8 wherein the plurality of individual computer messages include authorization request messages for payment transactions initiated by a cardholder, the authorization request messages including biometric data for authenticating the cardholder as a legitimate cardholder, and wherein sending the single batched message further comprises sending the single batched message to a biometric sub-processing system.

11. The method of claim 8 wherein sending the single batched message further comprises sending the single batched message to an input adaptor, the input adaptor configured to parse the single batched message into multiple individual computer messages for processing.

12. The method of claim 8 wherein the worker computing device includes a batch manager component and an output adaptor component, and wherein consolidating the plurality of individual computer messages further comprises consolidating, by the batch manager component, the plurality of individual computer messages and sending the consolidated message to the output adaptor.

13. The method of claim 12 wherein serializing each individual message further comprises receiving, by the output adaptor component, the consolidated message from the batch manager component and serializing each individual message within the consolidated message.

14. The method of claim 10 wherein continuously receiving the plurality of individual computer messages includes continuously receiving authorization request messages for payment transactions initiated by a cardholder with a merchant using a payment card, wherein the authorization request messages include candidate biometric data, and wherein said method further comprises sending the batched message to a sub-processing system for comparing the candidate biometric data to stored biometric data, and verifying the cardholder as the legitimate cardholder.

15. A non-transitory computer-readable medium that includes computer-executable instructions for asynchronous data consolidation and transmission over a computer network, wherein when executed by a worker computing device comprising at least one processor in communication with at least one memory device, the computer-executable instructions cause the worker computing device to:
continuously receive a plurality of individual computer messages from a source;
monitor a response time associated with each of the plurality of computer messages;
compare the monitored response time of each message to a service level agreement (SLA) time threshold value;
accumulate the plurality of individual computer messages within a queue until one of i) the response time associated with one of the plurality of computer messages reaches the SLA time threshold value is reached and ii) at least one other threshold value is reached;
consolidate the plurality of individual computer messages accumulated within the queue into a single batched message in response to one of the threshold values being reached;
serialize each individual message within the single batched message;
send the single batched message over the computer network to a sub-processing system; and
in response to sending the single batched message, receive a plurality of response messages, each response message being associated with a respective serialized individual message.

16. The non-transitory computer-readable medium of claim 15 wherein the at least one other threshold value comprises at least one of i) a time value for accumulating the plurality of individual computer messages within the queue, and ii) a number value of individual messages accumulated in the queue, and wherein when at least one of the time value and the number value is satisfied, the queue is closed and the accumulated messages are consolidated.

17. The non-transitory computer-readable medium of claim 15 wherein the plurality of individual computer messages includes authorization request messages for payment transactions initiated by a cardholder, the authorization request messages including biometric data for authenticating the cardholder as a legitimate cardholder, and wherein the batch message is transmitted to a biometric sub-processing system.

18. The non-transitory computer-readable medium of claim 15 wherein the single batched message is transmitted to an input adaptor, the input adaptor configured to parse the single batched message into multiple individual computer messages for processing.

19. The non-transitory computer-readable medium of claim 15 wherein the computer-executable instructions further cause the worker computing device to consolidate the plurality of individual computer messages into the single batched message, using a batch manager component, and transmit the single batched message to an output adaptor component.

20. The non-transitory computer-readable medium of claim 19 wherein the computer-executable instructions further cause the worker computing device to accept the single batched message from the batch manager component, serialize each individual message within the single batched message using the output adaptor component, and send the serialized message over the computer network.

21. The non-transitory computer-readable medium of claim 17 wherein the individual computer messages include authorization request messages for payment transactions initiated by a cardholder with a merchant using a payment card, wherein the authorization request messages include candidate biometric data, and wherein the computer-executable instructions further cause the worker computing device to send the batched message to a sub-processing system for comparing the candidate biometric data to stored biometric data, and verify the cardholder as the legitimate cardholder.

* * * * *